(12) United States Patent
Fehr et al.

(10) Patent No.: US 7,599,772 B2
(45) Date of Patent: Oct. 6, 2009

(54) AUTOMOTIVE SWITCH FABRIC WITH IMPROVED RESOURCE RESERVATION

(75) Inventors: Walton L. Fehr, Mundelein, IL (US); Patrick Jordan, Austin, TX (US); Donald Remboski, Dearborn, MI (US); Samuel M. Levenson, Arlington Heights, IL (US)

(73) Assignee: Temic Automotive of North America, Inc., Deer Park, IL (US)

( * ) Notice: Subject to any disclaimer, the term of this patent is extended or adjusted under 35 U.S.C. 154(b) by 482 days.

(21) Appl. No.: 10/865,211

(22) Filed: Jun. 10, 2004

(65) Prior Publication Data

US 2005/0038583 A1 Feb. 17, 2005

Related U.S. Application Data

(60) Provisional application No. 60/477,897, filed on Jun. 12, 2003.

(51) Int. Cl.
*G06F 7/00* (2006.01)

(52) U.S. Cl. .................. 701/36; 370/225; 370/389; 370/351; 370/395.21; 370/241; 713/153; 709/200

(58) Field of Classification Search .............. 701/36; 370/225, 389, 351, 395.21, 241–242; 713/153; 709/200

See application file for complete search history.

(56) References Cited

U.S. PATENT DOCUMENTS

| | | | |
|---|---|---|---|
| 5,323,385 A | 6/1994 | Jurewicz et al. | |
| 5,524,213 A | 6/1996 | Dais et al. | |
| 5,596,722 A | 1/1997 | Rahnema | |
| 5,629,928 A * | 5/1997 | Calvignac et al. | 370/237 |
| 5,732,074 A | 3/1998 | Spaur et al. | |
| 5,831,980 A * | 11/1998 | Varma et al. | 370/395.72 |
| 5,881,316 A * | 3/1999 | Chaney et al. | 710/56 |
| 5,959,993 A * | 9/1999 | Varma et al. | 370/397 |
| 6,252,614 B1 * | 6/2001 | Mullin | 345/560 |
| 6,252,884 B1 | 6/2001 | Hunter | |
| 6,259,699 B1 | 7/2001 | Opalka et al. | |
| 6,292,862 B1 | 9/2001 | Barrenscheen et al. | |
| 6,349,246 B1 | 2/2002 | Smith et al. | |
| 6,356,823 B1 * | 3/2002 | Iannotti et al. | 701/35 |
| 6,430,164 B1 | 8/2002 | Jones et al. | |
| 6,519,263 B1 * | 2/2003 | Huth | 370/444 |
| 6,542,739 B1 | 4/2003 | Garner | |
| 6,559,783 B1 | 5/2003 | Stokening | |
| 6,611,537 B1 | 8/2003 | Edens et al. | |
| 6,611,755 B1 | 8/2003 | Coffee et al. | |
| 6,631,134 B1 * | 10/2003 | Zadikian et al. | 370/395.21 |
| 6,747,365 B2 * | 6/2004 | Reinold et al. | 307/9.1 |
| 6,753,867 B2 * | 6/2004 | Mullin | 345/506 |
| 6,877,048 B2 * | 4/2005 | Bilak et al. | 710/52 |
| 6,885,916 B2 * | 4/2005 | Remboski et al. | 701/1 |
| 6,912,221 B1 * | 6/2005 | Zadikian et al. | 370/395.21 |
| 6,931,004 B2 * | 8/2005 | Reinold et al. | 370/389 |
| 6,934,612 B2 * | 8/2005 | Remboski et al. | 701/36 |
| 6,940,813 B2 * | 9/2005 | Ruutu | 370/231 |
| 7,023,851 B2 * | 4/2006 | Chakravorty | 370/392 |
| 7,027,387 B2 * | 4/2006 | Reinold et al. | 370/216 |

(Continued)

*Primary Examiner*—Thomas G Black
*Assistant Examiner*—Wae Louie (57) ABSTRACT

A vehicle communication network (200) includes a plurality of network elements (208-212) and a plurality of communication links (214-230) communicatively coupling the network elements in a point-to-point configuration. A portion of the communication capability is reserved according to a class of message traffic.

10 Claims, 6 Drawing Sheets

U.S. PATENT DOCUMENTS

| | | |
|---|---|---|
| 7,170,853 B2 * | 1/2007 | Remboski et al. ........... 370/225 |
| 7,173,903 B2 * | 2/2007 | Remboski et al. ........... 370/225 |
| 7,206,325 B2 * | 4/2007 | Nong ......................... 370/474 |
| 7,231,455 B2 * | 6/2007 | Marejka et al. ............. 709/233 |
| 7,272,496 B2 | 9/2007 | Remboski et al. |
| 7,310,327 B2 | 12/2007 | Fehr et al. |
| 2001/0001319 A1 | 5/2001 | Beckert et al. |
| 2002/0044553 A1 | 4/2002 | Chakravorty |
| 2002/0114305 A1 | 8/2002 | Oyama et al. |
| 2002/0132611 A1 | 9/2002 | Immonen et al. |
| 2002/0150050 A1 | 10/2002 | Nathanson |
| 2003/0026268 A1 | 2/2003 | Navas |
| 2003/0033394 A1 | 2/2003 | Stine |
| 2003/0042792 A1 | 3/2003 | Reinold et al. |
| 2003/0043739 A1 | 3/2003 | Reinold et al. |
| 2003/0043750 A1 | 3/2003 | Remboski et al. |
| 2003/0043779 A1 | 3/2003 | Remboski et al. |
| 2003/0043793 A1 | 3/2003 | Reinold et al. |
| 2003/0043799 A1 | 3/2003 | Reinold et al. |
| 2003/0043824 A1 | 3/2003 | Remboski et al. |
| 2003/0045234 A1 | 3/2003 | Remboski et al. |
| 2003/0045971 A1 * | 3/2003 | Reinold et al. ................. 701/1 |
| 2003/0045972 A1 * | 3/2003 | Remboski et al. .............. 701/1 |
| 2003/0046327 A1 * | 3/2003 | Reinold et al. ............. 709/200 |
| 2003/0051131 A1 * | 3/2003 | Reinold et al. ............. 713/153 |
| 2003/0065630 A1 | 4/2003 | Brown et al. |
| 2003/0093798 A1 | 5/2003 | Rogerson |
| 2003/0135639 A1 * | 7/2003 | Marejka et al. ............. 709/232 |
| 2003/0204636 A1 | 10/2003 | Greenblat et al. |
| 2003/0222982 A1 | 12/2003 | Hamdan et al. |
| 2004/0001593 A1 | 1/2004 | Reinold et al. |
| 2004/0002794 A1 | 1/2004 | Pillar et al. |
| 2004/0002799 A1 | 1/2004 | Dabbish et al. |
| 2004/0003227 A1 | 1/2004 | Reinold et al. |
| 2004/0003228 A1 | 1/2004 | Fehr et al. |
| 2004/0003229 A1 | 1/2004 | Reinold et al. |
| 2004/0003230 A1 | 1/2004 | Puhl et al. |
| 2004/0003231 A1 | 1/2004 | Levenson et al. |
| 2004/0003232 A1 | 1/2004 | Levenson et al. |
| 2004/0003233 A1 | 1/2004 | Reinold et al. |
| 2004/0003234 A1 | 1/2004 | Reinold et al. |
| 2004/0003237 A1 | 1/2004 | Puhl et al. |
| 2004/0003242 A1 | 1/2004 | Fehr et al. |
| 2004/0003243 A1 | 1/2004 | Fehr et al. |
| 2004/0003245 A1 | 1/2004 | Dabbish et al. |
| 2004/0003249 A1 | 1/2004 | Dabbish et al. |
| 2004/0003252 A1 | 1/2004 | Dabbish et al. |
| 2004/0095907 A1 | 5/2004 | Agee |
| 2004/0151114 A1 * | 8/2004 | Ruutu ......................... 370/230 |
| 2004/0199664 A1 | 10/2004 | Feldman |
| 2004/0213295 A1 | 10/2004 | Fehr |
| 2004/0227402 A1 | 11/2004 | Fehr et al. |
| 2004/0252697 A1 | 12/2004 | Wille et al. |
| 2004/0254700 A1 * | 12/2004 | Fehr et al. ..................... 701/36 |
| 2004/0258001 A1 | 12/2004 | Remboski et al. |
| 2005/0004727 A1 | 1/2005 | Remboski et al. |
| 2005/0004756 A1 | 1/2005 | Remboski et al. |
| 2005/0038583 A1 * | 2/2005 | Fehr et al. ..................... 701/36 |
| 2005/0113988 A1 | 5/2005 | Nasr et al. |
| 2005/0144309 A1 * | 6/2005 | Gish .......................... 709/233 |
| 2005/0210073 A1 * | 9/2005 | Oeda et al. .................. 707/200 |
| 2005/0243797 A1 | 11/2005 | Schrodi |
| 2006/0020717 A1 | 1/2006 | Remboski et al. |
| 2006/0266273 A1 | 11/2006 | Westberg et al. |

* cited by examiner

AUTOMOTIVE SWITCH FABRIC WITH IMPROVED RESOURCE RESERVATION

CROSS-REFERENCE TO RELATED APPLICATIONS

This application claims benefit under 35 U.S.C. § 119(e) to provisional patent application Ser. No. 60/477,897, filed Jun. 12, 2003, the disclosure of which is hereby expressly incorporated herein by reference.

TECHNICAL FIELD

The present patent relates to vehicles and particularly to quality of service (QoS) within communication networks within vehicles.

BACKGROUND

Vehicle builders have been using serial communication (multiplexing) between controllers to share information and distribute control for some time.

Doing so has greatly reduced the amount of vehicle signal wiring needed to implement the comfort, convenience, and safety features desired in modern consumer vehicles.

Control of the devices in the vehicle to implement desired features may be divided into controllers by function (powertrain, braking, steering, etc.), by location (engine compartment, seat, door, etc.) or in combinations thereof.

The controller for each of the functions/zones may share information with other controllers using a shared-access serial bus. The bus usually follows an industry standard such as J1850, CAN, LIN, Flexray, MOST and the like, well known to those of skill in the art. Multiple, independent busses may be used. In that case, one of the controllers may act as a gateway for information between the incompatible busses.

An alternative architecture introduces the idea of dividing the vehicle into geographic regions and locating a single controller for all of the features in that region. This architecture may also include the concept of smart peripherals to reduce the number of interconnections in localized areas of the vehicle. The smart peripherals use simple serial communication busses such as LIN busses to relay information from sensors to the zone controller or to accept actuator commands from the zone controller. The zone controllers may be linked by a serial communication bus structure.

Another alternative architecture incorporates a junction block that can be located in various zones of the vehicle. The junction block provides a mechanical and electrical connection point for power, ground and communication for small devices that are used to interface between input and output devices. The junction block also provides over current protection devices for the small connected devices, and multiple power sources distributed at different levels within the system.

Current bus protocols are not easily scalable and are limited in bandwidth. X-by-wire functionality, multimedia infotainment, navigation and other content intensive applications will put more demands on bandwidth and quality of service (QoS) requiring marked improvements in bandwidth, speed, delay, jitter, fault tolerance, message integrity, guaranteed delivery, availability and survivability.

Therefore, there is needed new architecture, such as switch fabric network architecture, for the automotive environment that provides scalability in both capacity and redundancy, at costs on par with existing bus architecture.

BRIEF DESCRIPTION OF THE DRAWINGS

This disclosure will describe several embodiments to illustrate its broad teachings. Reference is also made to the attached drawings.

DETAILED DESCRIPTION

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention because describing every possible embodiment would be impractical, if not impossible. Numerous alternative embodiments could be implemented, using either current technology or technology developed after the filing date of this patent, which would still fall within the scope of the claims defining the invention. Moreover, structure, features and functions of the herein described embodiments should be considered interchangeable, and every structure, feature or function may be used with any of the embodiments herein described.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Unless a claim element is defined by reciting the word "means" and a function without the recital of any structure, it is not intended that the scope of any claim element be interpreted based on the application of 35 U.S.C. § 112, sixth paragraph.

Figure 1:
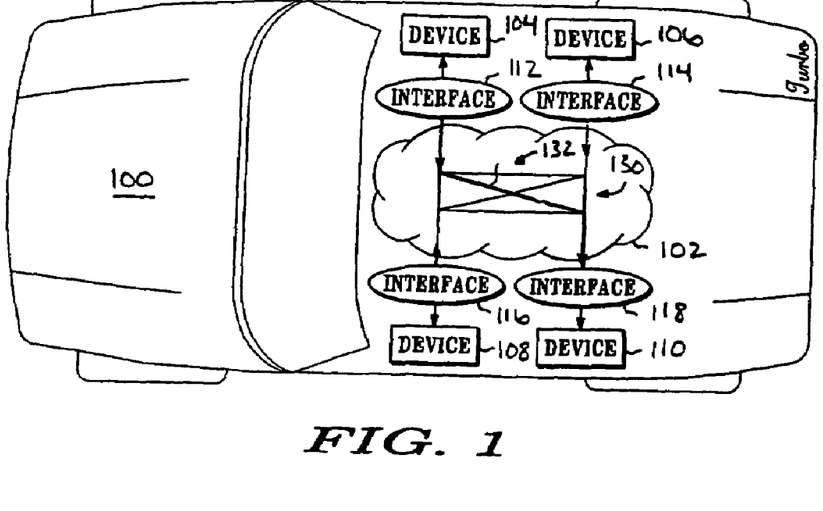
FIG. 1 is a schematic representation of a vehicle incorporating a vehicle network.

FIG. 1 illustrates a vehicle 100 including a network 102 to which various vehicle devices 104-110 are coupled. The devices may be sensors, actuators, processors and the like used in connection with various vehicle functional systems and sub-systems, such as, but not limited to, control-by-wire applications for throttle, braking, steering and suspension control, power accessories, communications, entertainment, and the like. The vehicle devices 104-110 may be coupled by interfaces 112-118, which may be any suitable interface for coupling the particular device to the network 102, and may be wire, optical, wireless or combinations thereof. It should be understood, however, that the interfaces are not required elements and that the devices 104-110 may be directly coupled to the network or may form portions of the network. The vehicle devices 104-110 may be adapted to provide one or more functions associated with the vehicle 100. These devices may be data producing, such as a sensor, data consuming, such as an actuator, processing or other devices, which both produce and consume data, or routing that transport data within the network. Of course, an actuator, typically a data-consuming device, may also produce data, for example where the actuator produces data indicating it has achieved the instructed state, or a sensor may consume data, for example, where it is provided instructions for the manner of function. Data produced by or provided to a device, and carried by the network 102, is independent of the function of the device itself. That is, the interfaces 112-118 may provide device independent data exchange between the coupled device and the network 102.

The network 102 includes a switch fabric 130 defining a plurality of communication paths 132 between the devices. The communication paths permit multiple simultaneous peer-to-peer or point-to-point, one-to-many, many-to-many, etc. data packet communication between the devices 104-110. During operation of the vehicle 100, data exchanged, for example, between devices 104 and 110 may utilize any available path or paths between the devices. In operation, a single path through the switch fabric 130 may carry all of the data packets representing a communication between the device 104 and the device 110, or several communication paths may carry portions of the data packets. Subsequent communications may use the same paths or other paths as dictated by the then state of the network 102. This flexibility provides reliability and speed advantages over bus architectures that are restricted to single communication paths between devices, and hence are subject to failure with failure of the single path or delays based upon congestion of the path. Moreover, communications between other of the devices 104-110 may occur simultaneously using the communication paths within the switch fabric 130.

The network 102 is a packet data network which may comply with a transmission control protocol/Internet (TCP/IP), asynchronous transfer mode (ATM), Infiniband, RapidIO, or any other packet data protocol now known or later developed. It may also include bus structures that are operated in a packet transit mode, as will be described herein later. As such, the network 102 may use data packets, having fixed or variable length, defined by one or more applicable protocols. For example, if the network 102 uses asynchronous transfer mode (ATM) communication protocol, an ATM standard data cell may be used.

The devices 104-110 need not be discrete devices. Instead, the devices may be systems or subsystems of the vehicle and may include one or more legacy communication media, i.e., legacy bus architectures such as J1850, CAN, LIN, Flexray, MOST or similar bus structures. In such embodiments, the respective interface 112-118 may be configured as a proxy or gateway to permit communication between the active network 102 and the legacy device 104-110.

Figure 2:
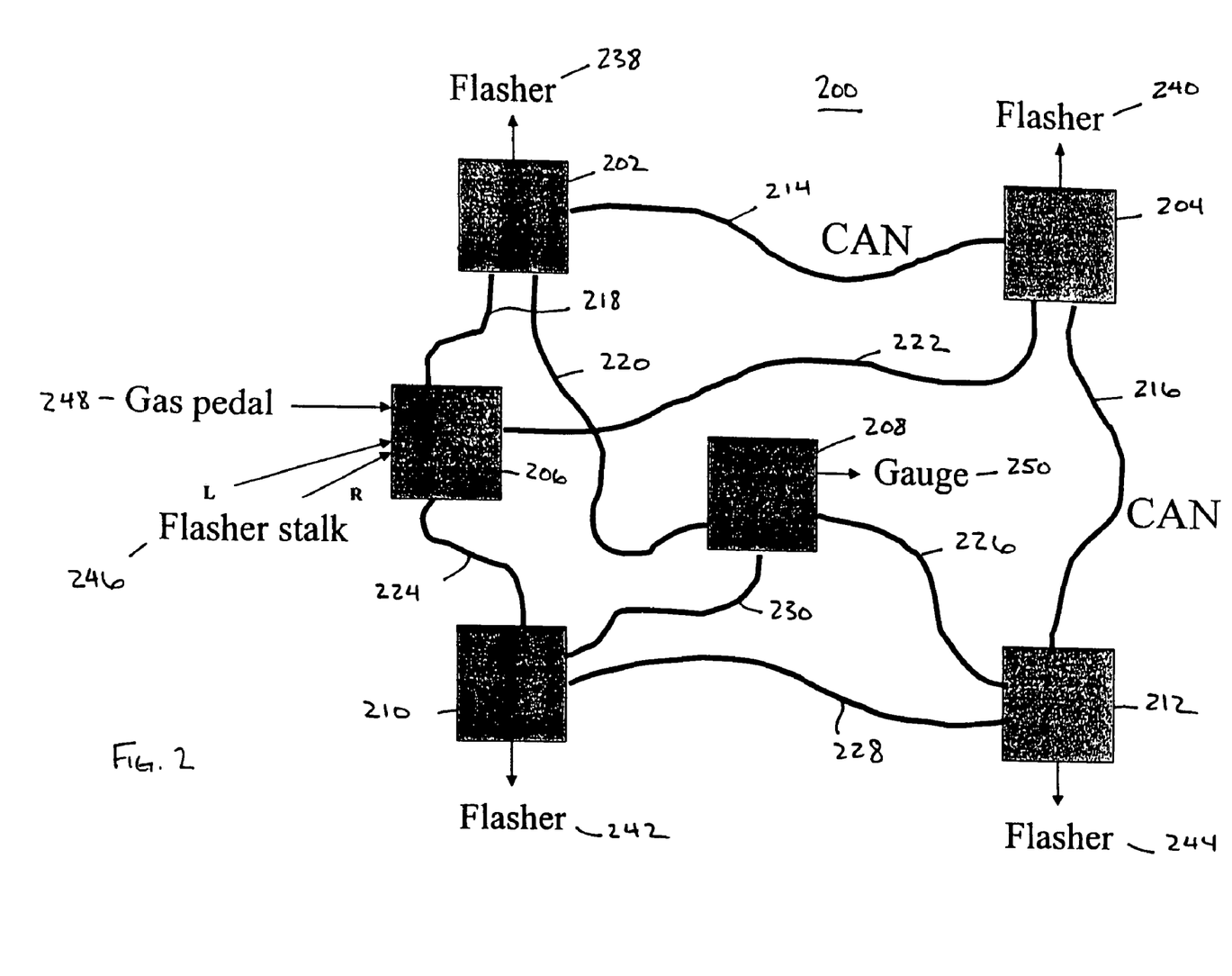
FIG. 2 is a schematic representation of a switch fabric forming a portion of a vehicle network.

FIG. 2 illustrates a network 200 that includes a plurality of network elements 202-212 communicatively coupled by communication links 214-230. A plurality of devices 238-250 are coupled at various locations, i.e., to several of the network elements 202-212 of the network 200 by corresponding communication links (not separately identified). The devices may be any vehicle device such as flashers 238-244, flasher control (stalk switch) 246, gas pedal 248, one or more gauges such as gauge 250 and the like.

The communication links 214-230 may be robust transport media and may be adapted from serial communication architecture as will be described. That is, the communication links 214-230 may be capable of providing guaranteed, reliable message transfer between the network elements. Any given communication link 214-230 may be a single bi-directional link, a single uni-directional link or combinations of bidirectional and unidirectional links or any combination of link technologies. The links may be defined according to an existing, robust transport mechanism designed for the automotive environment such as CAN, LIN, FLEXRAY, J1850, and the like or may be defined according to transport protocols in development or that are later developed. The links may also be combinations of technologies, or specified in accordance with virtually any other protocol.

The network 200 may incorporate at some level a system management function providing supervision, control, diagnostics and other related functionality. This functionality may be provide by way of a separate entity coupled to the network 200, or the functionality may be distributed within the network elements 202-212 or other suitable elements of the network 200.

Figure 3:
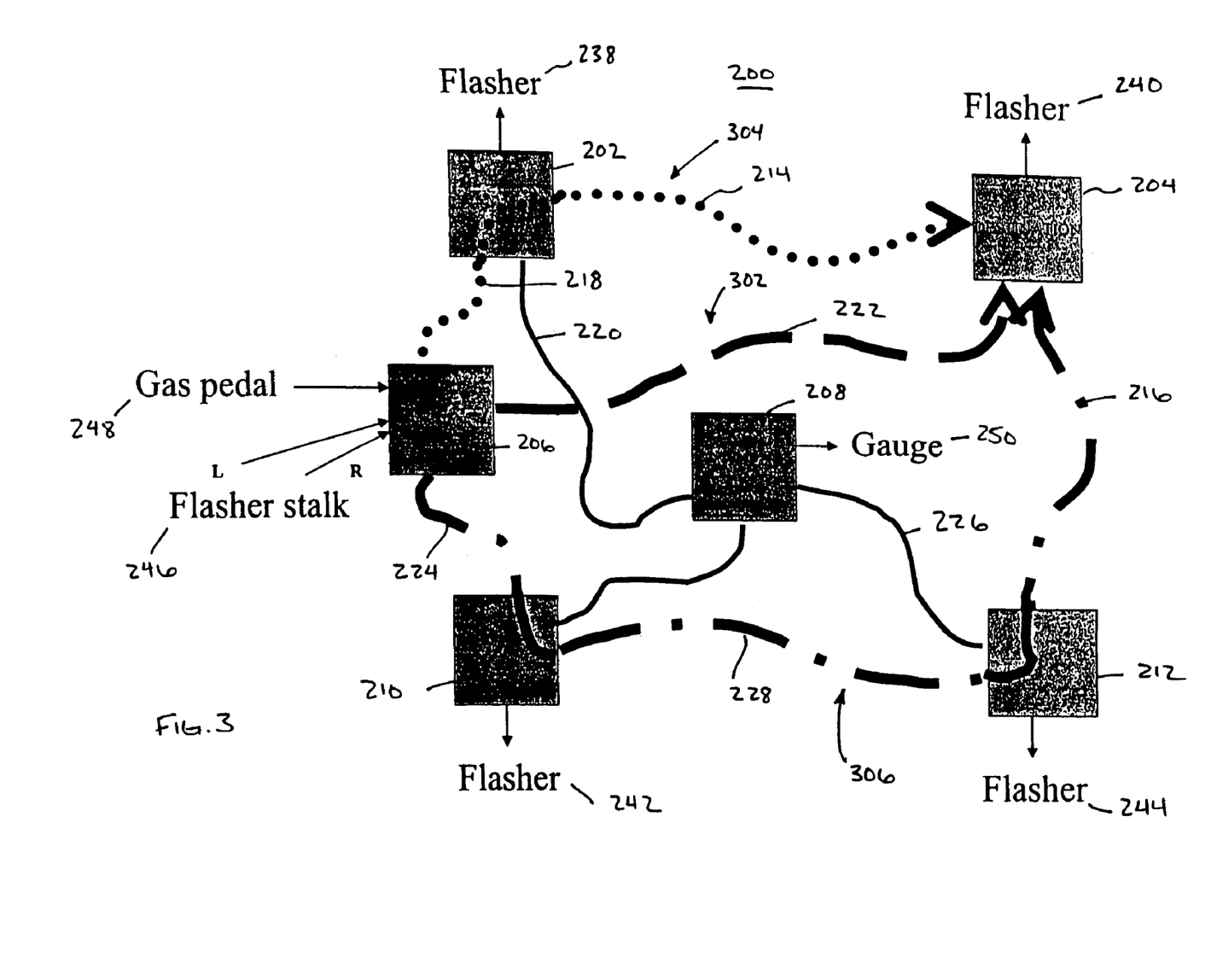
FIG. 3 is a schematic representation of a switch fabric forming a portion of a vehicle network and further illustrating communication paths within the network.

FIG. 3 illustrates the flexibility provided by the network 200. As an example of this flexibility, consider the task of communicating a signal from the flasher control 246 to the flasher 240. The network 200 is a packet based network, and permits any available communication path from a source point to a destination point to be used regardless of the communication media. As shown in FIG. 3, the signal from the flasher control 246 may traverse a relatively direct path 302 between the flasher control 246 defined by the network elements 206 and 204 and the communication link 222 joining them. Alternatively, a path 304 via the network elements 206, 202 and 204 and the communication links 218 and 214 joining them may be used. Still a further path 306 via the network elements 206, 210, 212 and 204 and the communication links 224, 228 and 216 may be used. As this example clearly reveals numerous communication paths may be defined. The availability of multiple paths allows the network to manage traffic to avoid congestion on one or more of the communication links 214-232 or at one or more of the network elements 202-212. The availability of multiple communication paths also permits fault tolerance in the event of failure of one or more network elements and/or communication links by permitting a communication path to be established bypassing the failed elements/links.

Figure 4:
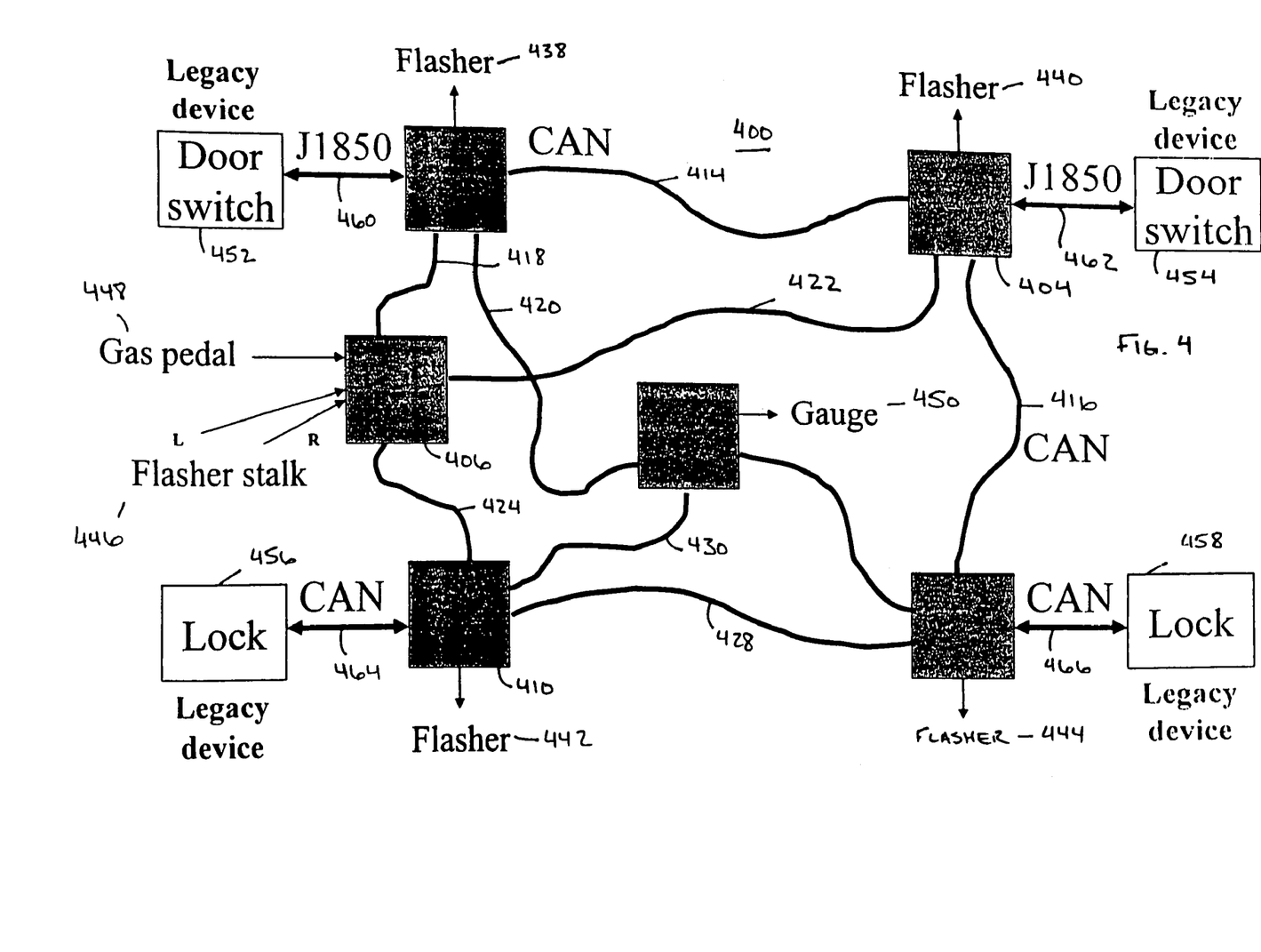
FIG. 4 is a schematic representation of a switch fabric forming a portion of vehicle network and further illustrating disparate communication links.

Referring now to FIG. 4, a network 400 includes a plurality of network elements 402-412 communicatively coupled by communication links 414-430. A plurality of devices 438-450 are coupled at various locations, i.e., to several of the network elements 402-412 of the network 400 by corresponding communication links (not separately identified). Legacy devices 452-458, i.e., devices adapted to communicate according to existing communication protocols such as J1850, CAN, LIN, Flexray, MOST and the like, are also coupled to the network 400. For example, devices 452 and 454, illustrated as door switches, may be coupled to network elements 402 and 404, respectively, by J1850 communication links 460 and 462. Devices 456 and 458, in this example door locks, may be coupled to network elements 410 and 412, respectively, by CAN communication links 464 and 466. Moreover, any of the communication links may be specified according to any suitable, preferably robust transport protocol. As illustrated in FIG. 4, communication link 414 and 416 may be specified according to CAN protocol, while the remaining links may be specified according to TCP/IP, CAN, LIN, Flexray, and the like.

Figure 5:
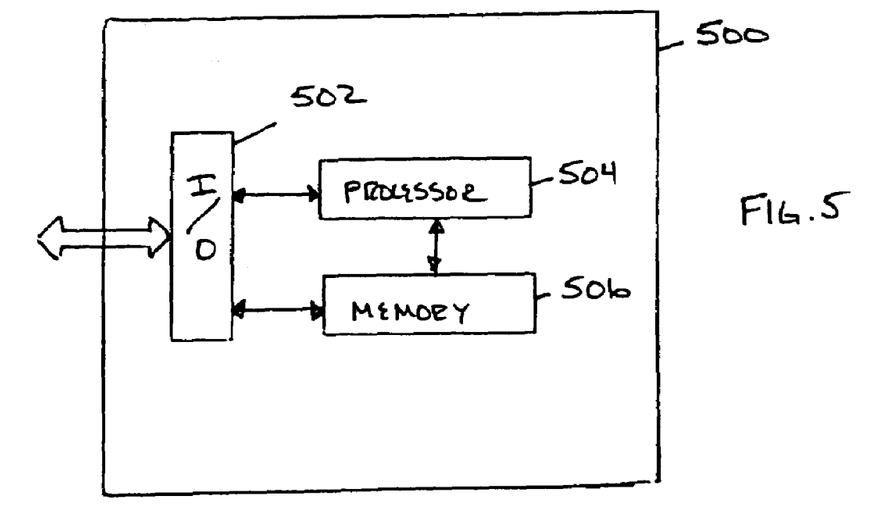
FIG. 5 is a block diagram of a network element that may be used in the networks shown in FIGS. 1-4.

A structure for the network elements may be as illustrated in FIG. 5. The network element 500 in FIG. 5 includes operationally coupled one or more input/output ports, one shown as port 502, a processor 504 and a memory 506. The memory 506 incorporates a control program (not depicted) to direct the processor to function in a manner that facilitates communication of data packets through the associated network. The input/output port 502 is adapted to be coupled to the communication links to send and receive data packets from the network element 500. Because the network element 500 may be coupled to more than one transport media type, the processor operates in accordance with the control program to accept data packets sent via a first transport media, to modify the data packets as necessary for communication via a second transport media and to communicate the data packets over the second transport media. In this manner, the network element may act as a proxy or gateway between the disparate communication media. It will be appreciated that alternate network elements may be used with enhanced functionality or simplified functionality as the application requires. For example, should the network element join connection links according to a single protocol, the processing capability for handling disparate protocols may not be required, and such a network element may be adapted to merely route the data packet according to the route information associated with the data packet.

Figure 6:
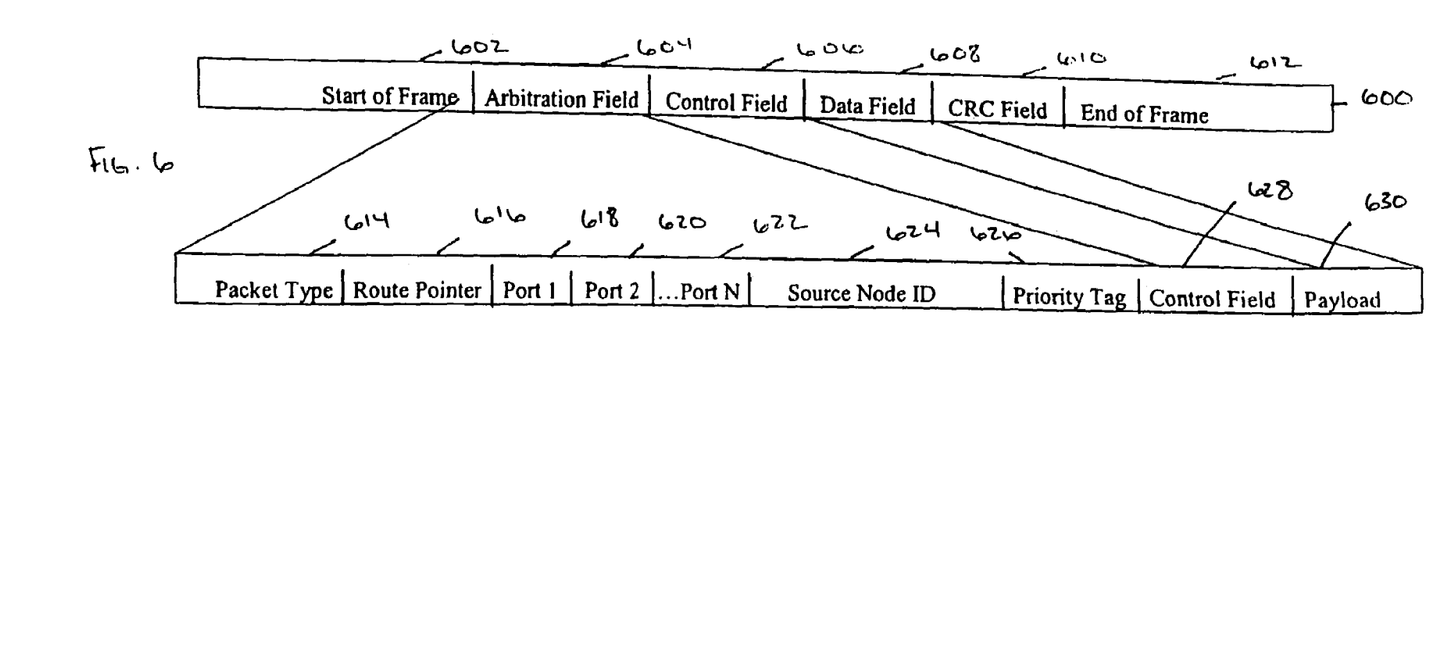
FIG. 6 is a schematic representation of a data packet.

A data packet used for communication within the networks described herein may include a packet type identifier, routing information, source ID information, QoS information and payload. Illustrated in FIG. 6 is an exemplary data packet 600 that may be used in the networks. The data packet 600 may include a start of frame field 602, an arbitration field 604, a control field 606, a data field 608, a cyclical-redundancy check field 610 and an end of frame field 612. The arbitration field 604 may be adapted to contain a packet type identifier 614, a route pointer 616, port identifiers 618, 620 and 622, a source node identifier 624 and a priority tag 626. The packet type 614 identifies the type of data packet such as bearer, discovery, advertisement, fault, control and the like. The route pointer 616, if the data packet contains route information, points to the current hop and is decrement with each hop. The route pointer 616 may also contain other types of route information. The port identifiers 618-622 identify the ports, e.g., network elements, the data packet has traversed. The source node 624 identifies the information source. The priority tag 626 may be reserved for QoS requirements and may contain a code identifying a service level for the data packet. The control field 606 may contain control data particular to the transport media, e.g., it may contain CAN control data if the data packet originated from or is destined for a CAN compliant communication device. The data field 608 contains the data carried by the packet, i.e., the payload.

The data packet 600 may be adapted to facilitate source routing, i.e., the route the data packet will take through the network is determined by the information source and this path information is contained within the data packet itself. The data packet 600 may also be adapted to facilitate destination routing, i.e., the route the data packet will take through the network is determined by each intermediate node and the next node information is contained within the data packet.

The data packet 600 may be adapted from known communication packet structures, such as a CAN data packet. As shown in FIG. 6, the arbitration field 604 is adapted to facilitate communication of data packets within the network 400 according to a number of different serial communication protocols. The arbitration field may also be adapted to contain routing information for communicating the data packet 600 through the network 400, i.e., information may be contained within the route pointer 616 field or otherwise contained within the arbitration filed 604. For example, the routing information may be a fixed label which remains with the data packet throughout the network 400. Each network element of the network 400 then includes a table to direct the data packet through the network 400 according to the label. Alternatively, the packet may be source routed, and the arbitration field may then contain routing information for each hop through the network. A further alternative is that the data packet 600, and particularly the arbitration information is modified at each hop so that it contains information for the next hop. Of course, other fields of the data packet 600 may be used to carry routing information, QoS information, or other types of information.

The networks 200 and 400 may be implemented into existing applications by adapting the communication links 214-232 from existing robust communication medium. In the implementations shown in FIGS. 2-3, the communication links 214-232 may be specified according to the CAN protocol. Alternatively, the communication links 214-232 may be specified according to the LIN, Flexray, J1850, MOST or other protocols. In the implementation shown in FIG. 4, the communication links 414-432 may be specified according to any suitable protocol such as CAN, LIN, Flexray, J1850, MOST and the like. Each of these protocols may define an arbitration mechanism to provide for and permit flow control. Arbitration may be specified to give priority on the communication link to a message with the highest priority. Priority may be indicated within a data packet in a message header, such as the priority tag 626 of the data packet 600. For example, the message header may contain zeros in the most dominant bits. If two network elements try to transmit on the same communication link at the same time, the message with the highest priority, e.g., the lowest value in the dominant bits, will win and the all others will release the communication link.

On initial startup of a network according to the embodiments described herein, such as networks 200 and 400, it necessary to identify all nodes of the network. The term "node" may refer to network elements, including but not limited to those network elements described in connection with networks 200 and 400, switches, routers and any and all coupled devices. It is also necessary to identify message identifiers that are of interest to particular nodes, to assign logical addresses to each node, to create a translation table of identifiers to node logical address, to create a routing table from node to node, and to create one or more back-up routes from node to node. Several levels of service may be associated with this so-called discovery process. For example, and as will be described in more detail, the network may offer nodes capable of multicast, encryption or other capabilities. Nodes may be configured to receive information or to advertise availability of information.

Discovery processes are known in connection with networks, and the commonly used Dijkstra algorithm may be employed to complete a network discovery process and calculate the routing table. These known processes however, assume a totally dynamic network and completes a full discovery process on each power up or upon detection of any failure. Depending on the scale of the network, this discovery process may take several minutes time, which is not practical in an automotive environment where the user expects to be able to enter the vehicle, start it and immediately operate it or where a fault may occur while the vehicle is operating and any significant delay in the completing the discovery process may present a safety concern. Having to wait several minutes for a discovery process to complete would be viewed as a defect, and would be unacceptable to users and manufacturers.

Networks according to the embodiments described herein generally are not totally dynamic. The network typically only becomes dynamic upon detecting a failure, i.e., the network is not dynamic until something goes wrong, or when new hardware is added to the network. Therefore, a last known state of the network may be saved and an incremental discovery process may be employed upon detecting a network change. The incremental discovery process may be completed with little or no effect on overall network performance. A suitable discovery process is disclosed and described in U.S. patent application Ser. No. 10/463,988, entitled a Discovery Process in a Vehicle Network, the disclosure of which is hereby expressly incorporated by reference.

The flexibility of the described network architecture may be used to implement a variety of network services and capabilities. One such capability is improved QoS. In addition to the inherent QoS advantages provided by the network architecture, advantages may be obtained through the control of messaging and traffic within the network. There are numerous QoS considerations depending on the data being communicated. For example, certain data may be defined as real time mission critical. Delivery of this data must be guaranteed within a few milliseconds (ms). Examples of such data are safety related controls, powertrain operating controls, braking and steering controls and the like. There may also exist non-real time mission critical data. This data also requires guaranteed delivery, but the time constrains on that delivery are flexible and may be in the hundreds of milliseconds. Examples of this data may include non-safety related vehicle operating controls and functions. There may also be real time non-mission critical data. This data may require delivery within tens of milliseconds without delivery guarantee. That is, if the data is not delivered within a delivery time frame, it may be simply dropped. This data may be voice/multimedia related data and the like. The network concepts herein described may be adapted to meet each of these QoS requirements.

Figure 7:
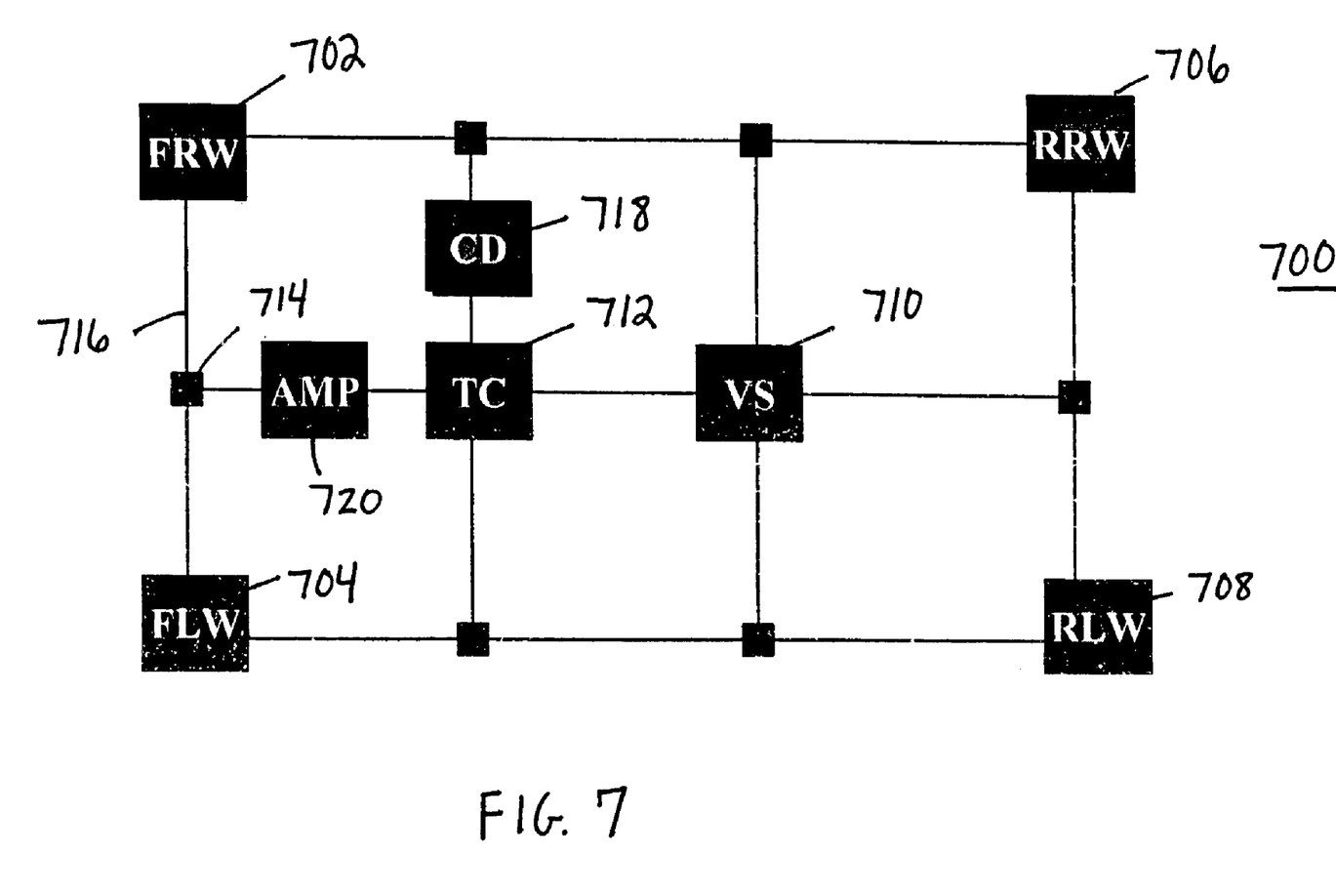
FIG. 7 is a schematic representation of an alternative embodiment of a vehicle network.

Referring to FIG. 7, a network 700 includes a plurality of network nodes. Two types of network nodes are illustrated in FIG. 7, although more than two types can be envisioned. Of the two types shown, the first type is smart nodes. Smart nodes 702-712 are shown in FIG. 7, which for the sake of the example illustrated in FIG. 7 represent the front right wheel (FRW) speed sensor 702, front left wheel (FLW) speed sensor 704, rear right wheel (RRW) speed sensor 706, rear left wheel (RLW) speed sensor 708, vehicle speed (VS) sensor 710 and transmission controller (TC) 712. The smart nodes 702-712 may be devices, modules, sub-systems and systems that may include one or more applications, may be a sink and/or source of data and may include intelligent switching capability. A second type of node is referred to as a dumb node, one of which is identified as dumb node 714. The dumb nodes 714 may be simple stateless switches capable of routing data packets according to embedded routing information. The dumb nodes 714 may be standalone devices as illustrated in FIG. 7, or they may be integrated into wiring connectors, wiring harnesses and other similar hardware. The smart nodes 702-712 and the dumb nodes 714 are communicatively coupled by a plurality of communication links, one illustrated as communication link 716. The communication links 716 may be any suitable communication media and may be specified in accordance with one or more serial bus architectures such as CAN, LIN, J1850, Flexray, MOST and the like. Alternatively, the communication links 716 may be specified according to one or more packet. data communication protocols such as TCP/IP, RapidIO, ATM and the like.

The network 700 illustrates devices that produce or consume real time mission critical data, i.e., wheel speed sensors (702-708), transmission controller (712) and vehicle speed sensors (710); data that may be used in connection with anti-lock braking, traction and stability control, speed control, collision avoidance and other vehicle operations. The network 700 also illustrates devices that produce or consume real time non mission critical data; i.e., selection and operation control signals and audio output signals from the CD player 718 and the amplifier 720.

The smart nodes 702-712, a system management function (not depicted), a combination thereof, or other network entity may detect that a node, either a smart node or a dumb node, is creating traffic, inhibiting traffic flow or otherwise function in a manner that that degrades the performance of the network. To bring this traffic situation under control, e.g., to make it compatible with the system capacity, multiple classes of service for messages may be defined and implemented. Message class information, or QoS class of the message, may be used to selectively control traffic within the network.

In one possible implementation, network nodes, e.g., the smart nodes 702-712, may be configured to perform an arbitration function. In such a configuration, an adjacent node may be configured to control the links to a node. The adjacent node would then be in a position to assert control of the link, e.g., by applying a dominant state on the link, using the arbitration mechanism defined by the link communication protocol. Each of the foregoing describe communication protocols, CAN, LIN, J1850, Flexray, MOST and the like that may be implemented on the links provide such an arbitration mechanism. Thus, the adjacent node may be used to shut off all traffic from one or more nodes on a link or to throttle the traffic to a set predetermined or average level.

As further described, messages communicated within the network may contain message class data, and the message class data may be used to manage traffic from a given port on a node. Messages may be assigned one of a number of different classes based upon the mission critical, non-mission critical and various other classes of messages that may be defined within the network. Message classes may be assigned by the node creating the message or may be generated by a central or distributed management function. The message class data may be carried in dedicated packages/frames or combined with the messages themselves or with other messages.

Both arbitration and message class traffic management allows for a reducing to a desired level or entirely stopping all or a portion of the traffic within all or a portion of the network. In another implementation, the physical link control mechanism may be used to disable one or more links for a set or dynamic percent of time or set or dynamic period of time responsive to any number of criteria. For example, the link may be caused to be disabled for a set period of time after a predetermined number of messages are sent or the average message rate exceeds a selectable threshold. The percent or period may be selective as to message class or other message characteristic, such as destination. For example, the network may disable a link for x seconds after n high message (QoS) class messages are sent within y seconds. The link may be responsive to the presence of a token, or similar permissive structure, at a node that defines a level of messaging traffic on the link to or from the node. The token may define a message budget, e.g., allowing x number of messages per unit time.

The token may further be time limited, and thus may expire after a defined period of activity or time.

The messaging rate can be similarly used to completely stop traffic, throttle to a given rate or selectively throttle messages by message (QoS) class. In addition, the messaging mechanism allows the flexibility of sending a node budget or token allowing it to send a given number of messages per message characteristic such as message (QoS) class or destination node. This can be applied in many situations. For example, a node receiving an overload of messages from multiple sources could send a message for all or some nodes to throttle all messages, specific messages or all messages of a given message (QoS) class.

To further ensure satisfactory QoS for the real time mission critical data, a configurable fraction or partition of communication bandwidth may be dedicated to a particular kind of message traffic, e.g., mission critical traffic. In general, the ability to handle multiple message classes on a switched network requires schemes to reserve resources in the network. This reservation may be static or may be dynamically changed in response to network traffic conditions or requests from specific applications.

In general, memory needs to be allocated to allow for the queuing of messages. This allocation may be on a per node port basis and may be separately allocated for input and output messages. An alternative may be to have shared memory for all ports. In any case, memory may be allocated based on message (QoS) class or other message characteristic.

For any buffering scheme, the algorithm to handle queuing may be selective based on message characteristic. For example, one message (QoS) class may be handled on a first-in-first-out (FIFO) basis while another class may be handled on a last-in-first-out (LIFO) basis.

Another approach to managing the flexible allocation of bandwidth is to throttle data at the smart nodes such that the smart node is limited to transmitting only at a fraction F of the available time averaged over a time period W. F and W may vary by traffic class and node, and these values may be preconfigured and/or configured by a system management function. Sufficient buffer space may be needed within the network, but not necessarily for all of the smart nodes, such that at least all real time mission critical traffic can be buffered in the case of output port contention. The buffer size and availability may be based upon the QoS of the traffic class. To prevent buffer overflow, and loss of data, throttling messages may be used to stop non-mission critical traffic as buffer occupancy grows to a trigger point. For example, smart nodes 702, 704 and 706 are coupled to a network 700. Each smart node 702 and 704 may be configured to send 0.25 Mbs to node 706 averaged over a 0.1 sec. time period. Both smart nodes 702 and 704 could potentially send a 1 Mbs burst for 0.25 sec. simultaneously to 706. In this case, the network 708 has to buffer at least 25 kb of data for 0.025 sec. As will be appreciated, requirements for buffering can quickly grow large unless small averaging windows are used. If 702 is non-mission critical, a throttling message may be employed to prevent it from simultaneously with 704 transmitting to 706. Alternatively or additionally, the averaging window for 702 may be made sufficiently small to reduce buffer requirements.

The networks described herein have application and as demonstrated may be adapted to operate with legacy architecture, systems and devices. It may become necessary or desirable to retrofit an existing vehicle that is specified with legacy architecture with one or more features that take advantage of the improved capability and QoS of the network structures according to this patent.

Other modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

We claim:

1. A vehicle comprising:
   a plurality of network nodes;
   the network nodes being interconnected by connection media for point-to-point communication, the connection media being operable in accordance with one or more communication protocols; and
   the connection media having a reserved communication capability, the reserved communication capability being associated with a class of message traffic and an associated buffer for queuing messages disassociated with the class of message traffic, the reserved communication capability being a fraction F of the available time averaged over a time period W, wherein F and W vary by message traffic class and an associated network node, the class of message traffic including at least a message class defined for mission critical traffic comprising at least one of vehicle safety related data, powertrain data, steering data, and braking data.

2. The vehicle of claim 1, the buffer being associated with one or more of the network nodes.

3. The vehicle of claim 1, a network node of the plurality network nodes, the network node having a port, the reserved portion being allocated to the port.

4. The vehicle of claim 1, the buffer being shared between at least a first network node and a second network node of the plurality of nodes.

5. The vehicle of claim 1, the buffer being operable in accordance with a queuing algorithm.

6. The vehicle of claim 1, the buffer being operable in accordance with either a first-in-first-out (FIFO) or a last-in-first-out (LIFO) protocol.

7. The vehicle of claim 6, wherein the selection of the FIFO or LIFO protocol is based upon the class of message traffic.

8. The vehicle of claim 1, wherein the buffer has a capacity, the buffer capacity being allocated based upon the class of message traffic.

9. The vehicle of claim 1, the reserved communication capability being dynamically determined.

10. The vehicle of claim 1, wherein the values F and W are either preconfigured or configurable by a system management function.

* * * * *

UNITED STATES PATENT AND TRADEMARK OFFICE
CERTIFICATE OF CORRECTION

PATENT NO. : 7,599,772 B2
APPLICATION NO. : 10/865211
DATED : October 6, 2009
INVENTOR(S) : Fehr et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1212 days.

Signed and Sealed this

Twenty-eighth Day of September, 2010

David J. Kappos
*Director of the United States Patent and Trademark Office*